Patented May 20, 1930

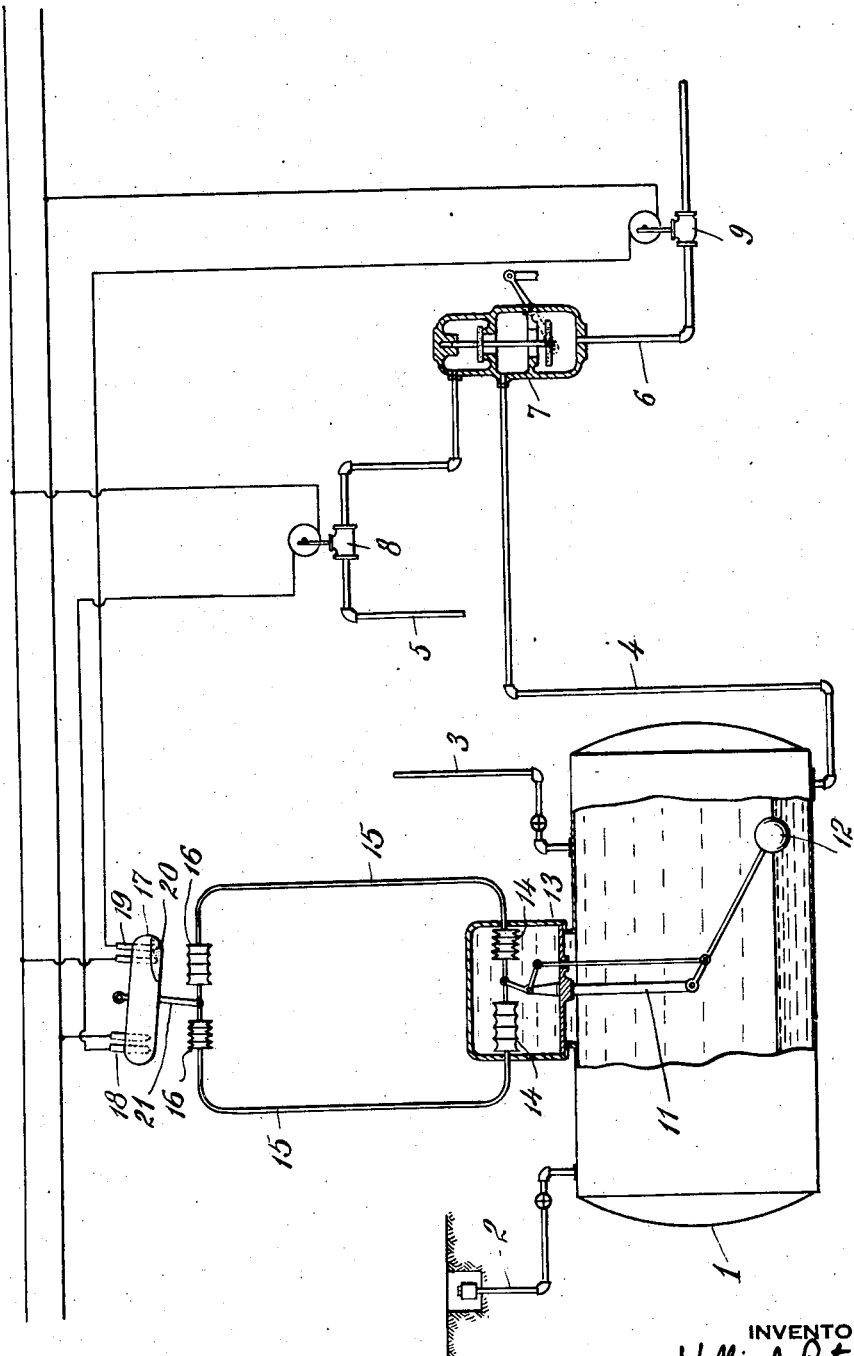

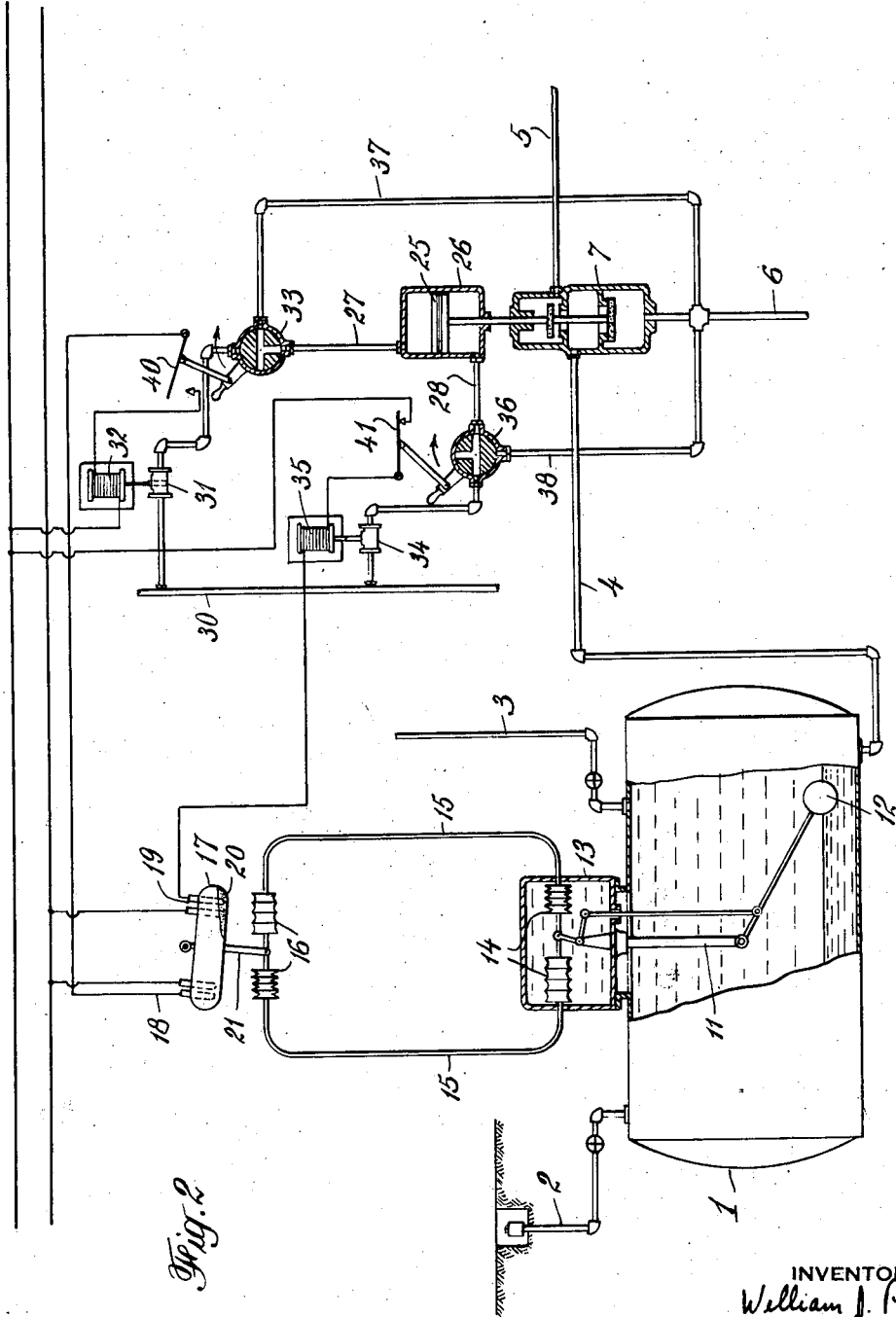

1,759,663

UNITED STATES PATENT OFFICE

WILLIAM J. PETER, OF NEW YORK, N. Y., ASSIGNOR, BY DIRECT AND MESNE ASSIGNMENTS, TO AQUA SYSTEMS INCORPORATED, OF NEW YORK, N. Y., A CORPORATION OF NEW YORK

MEANS FOR CONTROLLING THE FLOW IN HYDRAULIC OIL STORING AND DISPENSING SYSTEMS

Application filed February 5, 1929. Serial No. 337,586.

This invention relates to hydraulic oil storage and delivery systems and particularly to means for automatically preventing further inflow of oil during tank filling when the oil and water level has reached a predetermined low point, and for automatically preventing further outflow of oil during dispensing when the oil and water level has reached a predetermined high point, thereby, in the first instance, preventing discharge of oil into the water line, and, in the second, preventing discharge of water into the fuel tank of an automobile or other receptacle intended to receive oil.

In hydraulic systems for storing, handling and delivering oil, the storage tank is always filled with liquid, oil and water, the oil overlying the water. In dispensing, the oil is forced out through a pipe in the top of the tank by forcing water in through the bottom. There is danger that when the tank is emptied of oil, water will be forced out of the oil delivery pipe, and some means should be provided for preventing this. Such means disclosed in my Patent No. 1,582,855 consists of a float within the tank designed to float in water and sink in oil, and so connected to a valve in the oil discharge pipe that when the oil and water level reaches a point dangerously close to the mouth of the oil discharge pipe, the valve is automatically closed thus making it impossible for any water to follow the oil to the delivery point. In filling the tank with oil the pressure is reversed, the oil being forced in through the top of the tank and the water out through the bottom and to waste. In order to prevent oil from following the water into the drain some means should be provided arresting the flow at the proper time. In my Patent No. 1,582,856 I have disclosed the use of a float which automatically closes a valve in the oil inlet pipe when the oil and water level approaches close to the water discharge pipe, thus preventing further influx of oil and so stopping the downward movement of the oil and water level. In my Patent No. 1,582,857 I have accomplished the same result by automatically closing a valve in the water discharge pipe when the tank has been substantially filled with oil.

It is generally the object of the present invention to improve upon the control mechanism of these prior patents of mine. In doing this I remove the control valves from the tank itself to a point where they are more readily accessible and actuating them by remote controls. In order that the float within the tank may operate these remote controls without passing moving elements through the tank walls, an impracticable arrangement requiring stuffing boxes which would inevitably leak, I employ a sylphon or metallic bellows placed within the tank which is compressed and expanded by the float and thereby expands and compresses a companion sylphon outside the tank which in turn acts through electrical means to open and close the control valves.

In the accompanying drawings I have illustrated certain preferred embodiments of my invention. In these drawings, Figure 1 is a diagrammatic layout of a hydraulic oil storage and delivery system embodying the improvements of the present invention, the control valves being motor driven, and Figure 2 is a similar diagrammatic layout showing fluid operated control valves.

Referring first to Figure 1, 1 represents the storage tank of the system, 2 the oil inlet pipe, 3 the oil discharge pipe, and 4 the water inlet and discharge pipe. In delivering oil through the pipe 3, the pressure is supplied from a water supply pipe 5 which receives its water from the city mains, or from a suitable float box. The tank is connected to the sewer through a waste pipe 6, through which water is discharged during tank filling. A manually controlled valve 7 is placed at the juncture of the pipes 4, 5 and 6. When this valve is in its raised position, the pipe 5 is placed in communication with pipe 4, and communication with pipe 6, and the sewers cut off. When the valve is placed in its lower position, pipe 5 is closed and pipe 4 is placed in direct communication with the sewer through pipe 6. In addition to the manually controlled valve 7, the water pipe 5 is provided with a motor driven control valve 8 and the pipe 6 with a similar motor driven control valve 9, both of these valves being normally open. I shall now describe how these valves are automatically operated to control the flow of liquid into and out of the tank during the tank filling and oil delivering operation.

Pivotally mounted upon the lower end of a depending bar 11, situated at about the middle of the tank, is a float 12 designed to float in water and sink in oil. It therefore always remains at the water level, as illustrated. Mounted upon the upper side of the tank is a housing 13 within which are situated a pair of sylphons, or metallic bellows 14. In the drawing, the housing 13 is illustrated on a scale considerably larger than that of the tank itself so that in actual practice this housing forms a very small projection on the face of the tank, or may be sunk flush with the tank. In any event, the housing is in free communication with the interior of the tank and is completely filled with oil so that the sylphons are, in effect, within the tank. Each of these sylphons communicates by means of conduits 15 with a companion sylphon 16 mounted without the tank. These conduits 15 extend through the side walls of the housing 13 and make a fixed liquid tight joint therewith; hence no stuffing boxes are required. The sylphons and conduits are filled with a fluid, preferably a liquid and commonly oil. The two pairs of sylphons 14 with their companion sylphon 16 constitute two separate and distinct systems, the fluid from one having no connection with that of the other; they therefore operate exactly as one sylphon system would operate. The float 12, through its own stem and suitable link work, is operatively connected to a point midway between the two sylphons 14 so that as the water level rises and falls and the float with it, these sylphons are compressed and expanded. As will be clear from a study of the drawing, when the left-hand sylphon is expanded, the right-hand one will be correspondingly compressed, and of the companion sylphons 16, the left-hand one will be compressed and the right-hand one expanded. Thus, the rise and fall of the float with the water level is communicated to the outer sylphons and results in a definite and directed movement of a point midway between them.

Pivotally mounted adjacent the outer sylphons 16 is a mercury switch 17 having a pair of contacts 18 at one end and a similar pair 19 at the other end; a globule of mercury 20 moving from one pair of contacts to the other as the switch tube is tilted. An arm 21 extends from the switch to a point midway between the two sylphons 16 so that their expansion and contraction results in a tilting of the switch, the position of which therefore depends upon the position of the water level within the tank. The contacts 18 are electrically connected through a source of electrical energy with the motor of valve 8, and contacts 19 with the motor valve 9. When the switch is tilted in the position shown, the contacts 19 are embedded in the mercury and the circuit through the motor of valve 9 is closed. This motor therefore is operated to close the valve 9 and communication with the sewer is cut off. When the switch is tilted in the other direction so that the mercury closes the circuit through contacts 18, the motor of valve 8 is operated to close that valve and mean while the valve 9 is opened.

The system operates as follows: Assuming that the tank is filled with water and is to be filled with gasoline, or other oil, the operator lowers the valve 7 so that the pipe 4 is in communication with the sewer through pipe 6 and communication with pipe 5 is cut off (the illustrated position of the valve). Connection is made with a tank wagon, or other source of supply through the fill pipe 2, whereupon the oil flows by gravity into the tank forcing the water out through the pipe 4, valve 7, pipe 6, and to the sewer. When the water level has reached a predetermined low point below which it would be dangerous to go, because of the possibility of oil following the water to the sewer, my control means come into play to stop the flow. Thus, when the float 12 reaches this predetermined low position (the position illustrated) the mercury switch 17, through the action of the sylphons is tilted into the position illustrated in which the contacts 19 are bridged by the mercury and close the circuit including the motor of valve 9. This valve is thereupon automatically closed and further flow of water into the sewer prevented. Thereafter it is impossible to add further oil to the tank and the flow ceases. The hose leading from the tank wagon to the tank is thereupon disconnected and the system is in readiness for dispensing oil. To do this the operator moves the valve 7 into its upper position in which communication with pipe 6 is closed and with pipe 5 opened, the tank being thereby placed under the necessary hydraulic pressure to force the oil out through the delivery pipe 3 when the usual valves in that pipe are opened. When the water level reaches a predetermined high point beyond which it would be dangerous to go because of the possibility of water following the gasoline through the discharge pipe 3, the flow is automatically arrested. The float 12 which has floated upward upon the water, acting through the sylphons, tilts switch 17 to the left and closes the circuit through contacts 18, whereupon the motor of valve 8 acts to close that valve and thus cut off the source of pressure to the tank.

In Figure 2 I have illustrated a similar set of controls for a similar hydraulic system. The float, sylphon and switch are identical with those illustrated in Figure 1, but the control valves and operating mechanism are different. In this form of device the automatic control is effected directly through manipulation of the valve 7 in a manner which I shall now describe.

The valve stem of the valve 7 is extended beyond the valve housing and terminates in a piston 25 slidably mounted within an enclosed cylinder 26. The valve 7 is therefore controlled by the piston 25 whch is reciprocated by means of hydraulic pressure, water being introduced through a pipe 27 to move the valve 7 downward and through a pipe 28 to move it upward. As explained in connection with Figure 1, when the valve 7 is in its raised position the pipe 4 is in direct communication with the main source of hydraulic pressure through the pipe 5, and when the valve 7 is in its lower position the pipe 4 is in communication with the sewer through pipe 6. The pipe 27 receives its water from any suitable source of water supply, such as the pipe 30, but flow through the pipe 27 is controlled by two valves, a valve 31 operated by means of solenoid 32 and a three-way valve 33 which is manually controlled. Similarly, pipe 28 receives its water from the pipe 30 and is provided with two valves, a valve 34 controlled by a solenoid 35 and a manually controlled three-way valve 36. Each of the manually controlled three-way valves, 33 and 36, communicate with the pipe 6 and hence the sewer by pipes 37 and 38 respectviely.

The contacts 18 of the switch 17 are in circuit with a source of electrical energy and solenoid 32, and contacts 19 are similarly in circuit with the solenoid 35. Thus, when the switch is tilted toward the right, as shown, the solenoid 35 is energized and its valve 34 opened, whereas the solenoid 32 being in an open circuit is de-energized and its valve held closed by gravity or otherwise. Each solenoid circuit also includes a manually operated switch. The circuit of solenoid 32 includes a switch 40 and that of solenoid 35 a switch 41, these switches being manipulated simultaneously with the manipulation of the corresponding three-way valves.

The system operates as follows: Assume that the tank is being filled with gasoline, the valve 7 being in such position that the pipe 4 is in communication with the pipe 6 and that the water level has reached the point at which further flow is to be cut off. At the beginning of the filling operation the operator has turned the three-way valves 33 and 36 so that the upper end of the cylinder 26 is placed in communication with the sewer and the lower end in communication with the pipe 30. This setting which is preferably effected by a single movement also opens the switch 40 and closes the switch 41. The parts are therefore in the position illustrated. The water level having reached the predetermined low point, the float 12, acting through the sylphons and the switch 17, completes the circuit through solenoid 35, opens the valve 34 and permits water to flow into the lower end of the cylinder 26 and hence move the piston 25 upward. During this upward movement water is forced out of the upper end of the cylinder 26 through the pipe 27, the valve 33, and the pipe 37. Thus, the valve 7 is moved into its upper position, communication with the sewer automatically cut off, and further influx of oil rendered impossible. The system is now in readiness for oil dispensing. The operator turns the three-way valves, 33 and 36, clockwise through 90°, thereby placing the upper end of the cylinder 26 in communication with the pipe 30, when the valve 31 shall be opened, and placing the lower end of the solenoid 26 in communication with the sewer. At the same time the switch 40 is closed and the switch 41 opened. When the water level has reached the predetermined high point, the float 12, acting through the sylphons and the switch 17 closes the circuit through contacts 18 and the solenoid 32 thereby opening the valve 31 and permitting flow of water into the upper end of solenoid 26 which moves the piston 25 downward to shut off communication between pipes 4 and 5, and open communication between pipes 4 and 6. At the same time any water in the lower end of cylinder 26 is free to pass to the sewer through the pipe 38.

I claim:

1. In a hydraulic oil storage and delivery system the combination of a tank, a float designed to float on the water in the tank, valves controlling the flow of liquid into and out of the tank, an expansible-compressible element immersed in the liquid within the tank and operated by the rise and fall of the float, a fluid conduit leading from said expansible-compressible element to a point without the tank, and means operated by the fluid for operating the control valves, whereby the flow is governed by the position of the float.

2. In a hydraulic oil storage and delivery system the combination of a tank, a float designed to float on the water in the tank, valves controlling the flow of liquid into and out of the tank, an expansible-compressible element immersed in the liquid within the tank and operated by the rise and fall of the float, a fluid conduit leading from said expansible-compressible element to a second expansible-compressible element similar to the first situated without the tank, a fluid filling both elements and the conduit whereby when one is compressed the other is expanded and vice versa, and means operated by the second expansible-compressible elements for operating the control valves, whereby the flow is governed by the position of the float.

3. In a hydraulic oil storage and delivery system, the combination of a tank, a float designed to float on the water in the tank, valves controlling the flow of liquid into and out of the tank, a metallic bellows immersed in the liquid within the tank and expanded and compressed by the rise and fall of the float, a conduit leading from said bellows to a similar bellows situated without the tank, a fluid filling both bellows and the conduit whereby when one is compressed the other is expanded and vice versa, a switch opened and closed by the outer bellows, and electrical means controlled by the switch for operating the control valves, whereby the flow is governed by the position of the float.

4. In a hydraulic oil storage and delivery system, the combination of a tank, an oil inlet pipe, an oil discharge pipe near the top of the tank, a water pipe through which water is passed to force the oil out through the oil discharge pipe, a valve in the water pipe, a waste pipe through which the water is forced when oil is introduced through the oil inlet pipe, a valve in the waste pipe, a float designed to float on the water in the tank, a metallic bellows immersed in the liquid within the tank and expanded and compressed by the rise and fall of the float, a conduit leading from said bellows to a similar bellows situated without the tank; a fluid filling both bellows and the conduit whereby when one is compressed the other is expanded and vice versa, a switch opened and closed by the outer bellows, and electrical means controlled by the switch for closing the valve in the water pipe when during delivery of oil, the water level reaches a predetermined high point, and for closing the valve in the water pipe, when during tank filling, the water level reaches a predetermined low point.

In testimony whereof I affix my signature.

WILLIAM J. PETER.